July 22, 1930.  D. B. PERRY  1,771,346
OILING SYSTEM FOR CHAIN DRIVES

Filed April 24, 1928

DAVID B. PERRY INVENTOR.

BY Robert V. Morse

ATTORNEY.

Patented July 22, 1930

1,771,346

UNITED STATES PATENT OFFICE

DAVID B. PERRY, OF ITHACA, NEW YORK, ASSIGNOR TO MORSE CHAIN COMPANY, OF ITHACA, NEW YORK, A CORPORATION OF NEW YORK

OILING SYSTEM FOR CHAIN DRIVES

Application filed April 24, 1928. Serial No. 272,371.

This invention relates to the lubrication of silent chains when enclosed in cases. Owing to the speed at which such chains run it is not practicable to have them run directly thru an oil bath in the case, owing to the power losses entailed, and various devices have been proposed to supply the chain with the lubrication required. The object of the present invention is to improve on such devices along the lines of economy, simplicity, and reliability, and to provide an apparatus which can be easily applied to a chain case and which has no external moving parts working thru openings in the case. Another object is to provide such a device whose operation can be inspected while running without opening the case. A further object is to provide a device which can be readily constructed or repaired from standard fittings available in any factory or machine shop, so as to avoid shut-downs and special servicing from the chain factory. Other objects will become apparent as the description proceeds.

Figure 1:
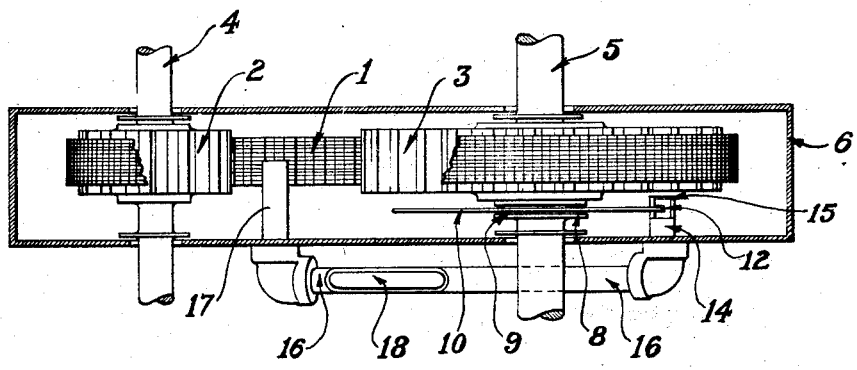
Figure 3:
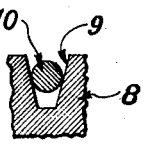
Figure 2:
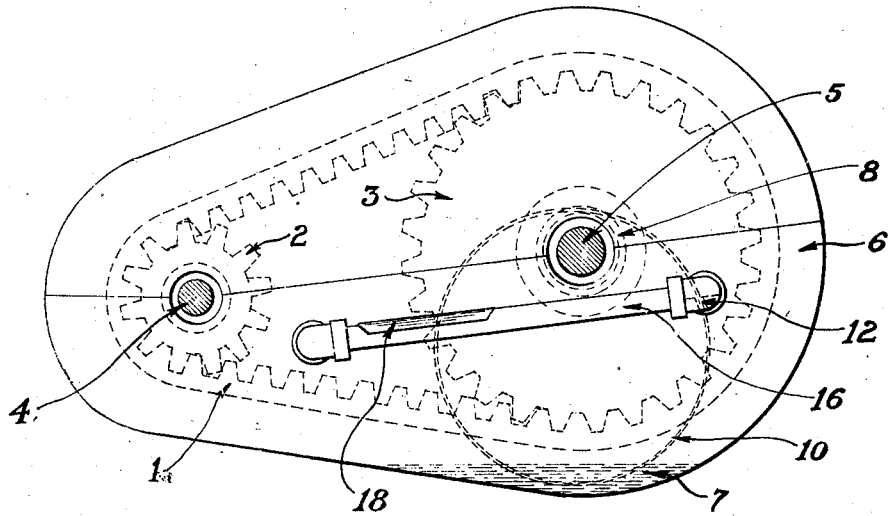
Figure 4:
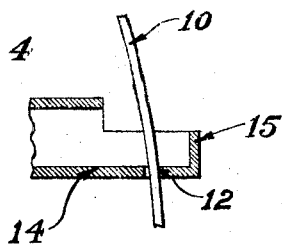

Referring now to the drawings, Fig. 1 is a cross-sectional plan view partly in elevation of a chain drive, chain case, and lubricating mechanism according to this invention; Fig. 2 is a side elevation of the same; Fig. 3 is a detail cross-section showing the manner in which the pumping ring is gripped and driven; Fig. 4 is a detail cross-section of the collecting pipe with a portion of the oil pumping ring in elevation.

Taking up first the general mechanism shown in Fig. 1 and Fig. 2, the chain 1 is illustrated running between the sprockets 2 and 3 which are mounted on the shafts 4 and 5 respectively. Surrounding this chain drive is an oil tight case 6 which is usually made in two parts to permit assembly and inspection. The lower half of the case 6 also forms an oil reservoir containing a suitable quantity of oil 7, preferably at such a level as not to be churned by the chain.

Mounted on the shaft 5 is a driving collar 8 having a V groove 9 as shown in cross-section in Fig. 3, and a smooth annular ring preferably of circular cross-section is hung in the groove 9. This ring 10 is sufficiently large in diameter to extend down to the oil bath 7; and the weight of the ring with the grip of the V groove 9 even when coated with oil gives sufficient friction to rotate the ring 10 around the shaft 5 and thru the oil bath 7.

The oil ring 10 also passes thru a hole 12 in a pipe 14 which projects in thru one side of the case 6. A portion of the upper half of the pipe 14 is cut away and the remaining end of the pipe 14 is closed as shown at 15 in Fig. 4 for example, forming a cup or scoop with the hole 12 in its bottom. The pipe 14 extends to the outside of the case 6 and connects with a downwardly inclined pipe 16 which in turn connects with a pipe 17 which projects inwardly thru the case 6 between the upper and lower strands of the chain 1 and terminates so that the oil discharged from the pipe 17 will fall upon the lower strand of the chain. A window or opening 18 is provided in the inclined pipe 16,—this opening 18 being preferably covered with glass or other transparent material so that when the drive is running the oil can be seen flowing down the pipe 16. The transparent cover may be omitted and a mere notch or cut used where the drive is not exposed to dust, lint or other material likely to mix with the oil. By the use of the opening 18 it is possible to inspect the drive and see whether the chain is being properly lubricated without opening the case or stopping the machinery.

The operation is as follows:—When the chain drive is running the oil ring 10 is rotated by friction with the collar 8, and the ring 10, though smooth, carries with it a considerable quantity of oil picked up from the bath 7. As the ring 10 passes thru the hole 12 in the pipe 14, a large proportion of this oil is scraped off, and accumulating in the cup 15 the oil runs out thru the pipe 14, down the inclined pipe 16 and in thru the pipe 17 to fall on and lubricate the chain 1 as described. Though the ring 10 is smooth and only driven by friction, and the hole 12 is sufficiently large to permit an easy passage of the ring 10, yet with chains running at ordinary speeds a sufficient quantity of oil is pumped to maintain a continuous stream of oil pouring upon the chain.

While I have in the foregoing described a specific embodiment of my invention it will be understood that this is merely by way of illustration, and that the apparatus is susceptible to various modifications and adaptations in different installations as will be apparent to those skilled in the art, without departing from the scope of the invention as defined in the following claims.

I claim:

1. In a lubricating system for chain drives, the combination of a chain case whose lower portion forms an oil reservoir, a shaft, a collar on said shaft having a V groove, a ring running in said groove and extending down to the oil reservoir, a pipe extending into the case and having its end partially closed and having a hole thru which the ring passes, a downwardly inclined pipe exterior to the case and connected to the first mentioned pipe, and a pipe connected to said inclined pipe and extending into the case and adapted to discharge oil upon the chain drive.

2. In a lubricating system for chain drives, the combination of a chain case whose lower portion forms an oil reservoir, a shaft, a collar on said shaft having a groove, a ring running in said groove and extending down to the oil reservoir, a pipe extending into the case and having a hole thru which the ring passes, a downwardly inclined pipe exterior to the case and connected to the first mentioned pipe, and a pipe connected to said inclined pipe and extending into the case and adapted to discharge oil upon the chain drive.

3. In a lubricating system for chain drives, the combination of a chain case whose lower portion forms an oil reservoir, a shaft, a collar on said shaft having a groove, a ring running in said groove and extending down to the oil reservoir, a pipe extending into the case and having an opening adapted to scrape against the ring to pick up oil therefrom, a downwardly inclined pipe exterior to the case and connected to the first mentioned pipe, and a pipe connected to said inclined pipe and extending into the case and adapted to discharge oil upon the chain drive.

4. In a lubricating system for chain drives, the combination of a chain case whose lower portion includes an oil reservoir, a shaft, an oil ring running on said shaft and extending down to the oil reservoir, a pipe extending into the case and having an opening adapted to scrape against the ring to pick up oil therefrom, a downwardly inclined pipe exterior to the case and connected to the first mentioned pipe, said inclined pipe having a window by which the flow of oil may be observed, and a pipe connected to said inclined pipe and extending into the case and adapted to discharge oil upon the chain drive.

5. In a lubricating system for chain drives, the combination of a chain case whose lower portion includes an oil reservoir, a shaft, an oil ring running on said shaft and extending down to the oil reservoir, a pipe having an opening adapted to scrape against the ring and pick up oil therefrom, a downwardly inclined pipe connected to the first mentioned pipe, and a pipe connected to said inclined pipe and adapted to discharge oil upon the chain drive.

6. In a lubricating system for chain drives, the combination of a chain case whose lower portion includes an oil reservoir, a shaft, a collar on said shaft having a V groove, a ring running in said groove and extending down to the oil reservoir, a pipe extending into the case and having an aperture thru which the ring passes adapted to scrape against the ring and pick up oil therefrom, a downwardly inclined pipe exterior to the case and connected to the first mentioned pipe, said inclined pipe having a window by which the flow of oil may be observed, and a pipe connected to said inclined pipe and extending into the case and adapted to discharge oil upon the chain drive.

7. In a lubricating system for chain drives, the combination of an oil reservoir located below the chain drive, a shaft, an oil ring running on said shaft and extending down to the oil reservoir, and a pipe having an aperture thru which the ring passes adapted to scrape oil from the ring and conduct it to a point where it may drop upon the chain to lubricate it.

In testimony whereof I have hereunto signed my name this 18th day of April, 1928.

DAVID B. PERRY.